B. B. HOGABOOM.
STRAINER FOR HONEY FILLING MACHINES.
APPLICATION FILED DEC. 21, 1911.
1,053,728.
Patented Feb. 18, 1913.
2 SHEETS—SHEET 1.
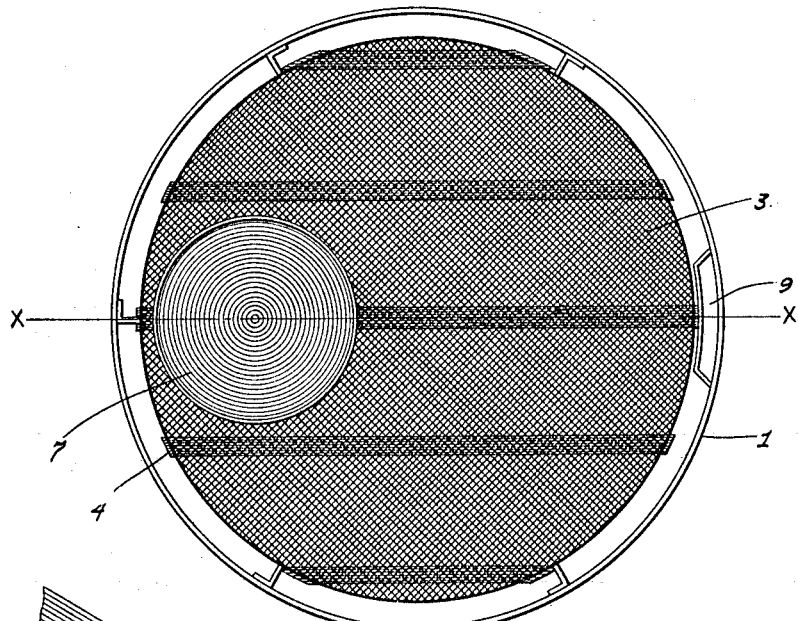
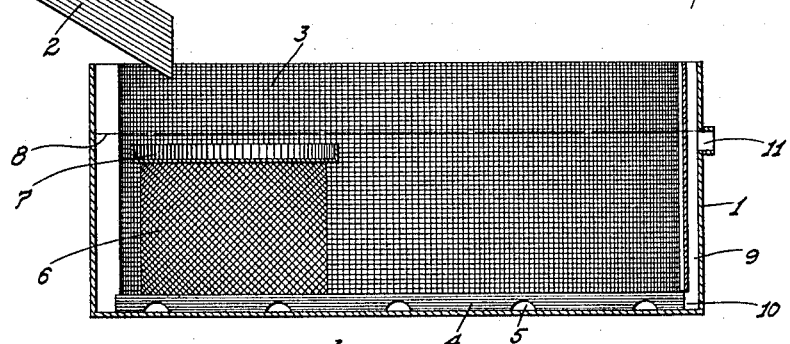
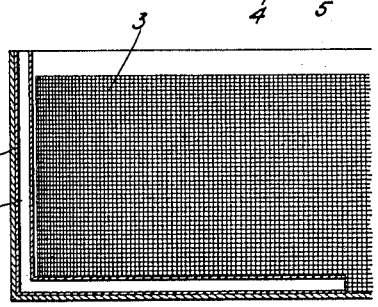
Witnesses
Frank H. Carter
J. B. Webster
Inventor
B. B. Hogaboom
By Perry D. Webster
Attorney B. B. HOGABOOM.
STRAINER FOR HONEY FILLING MACHINES.
APPLICATION FILED DEC. 21, 1911.
1,053,728.
Patented Feb. 18, 1913.
2 SHEETS—SHEET 2.
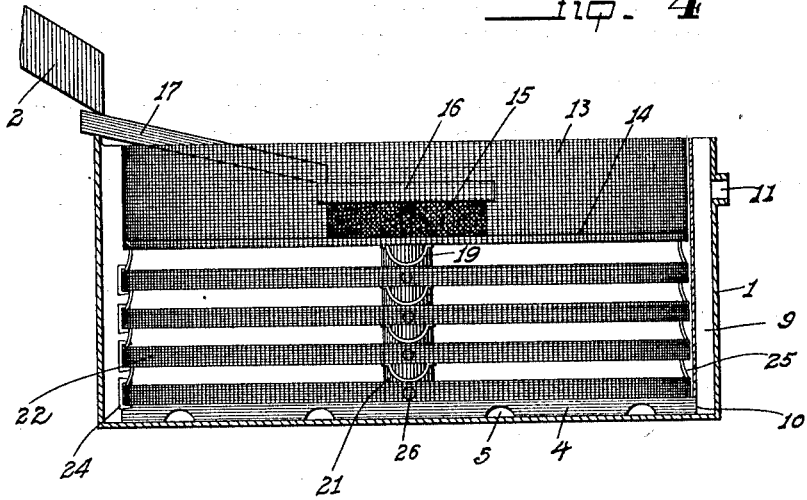
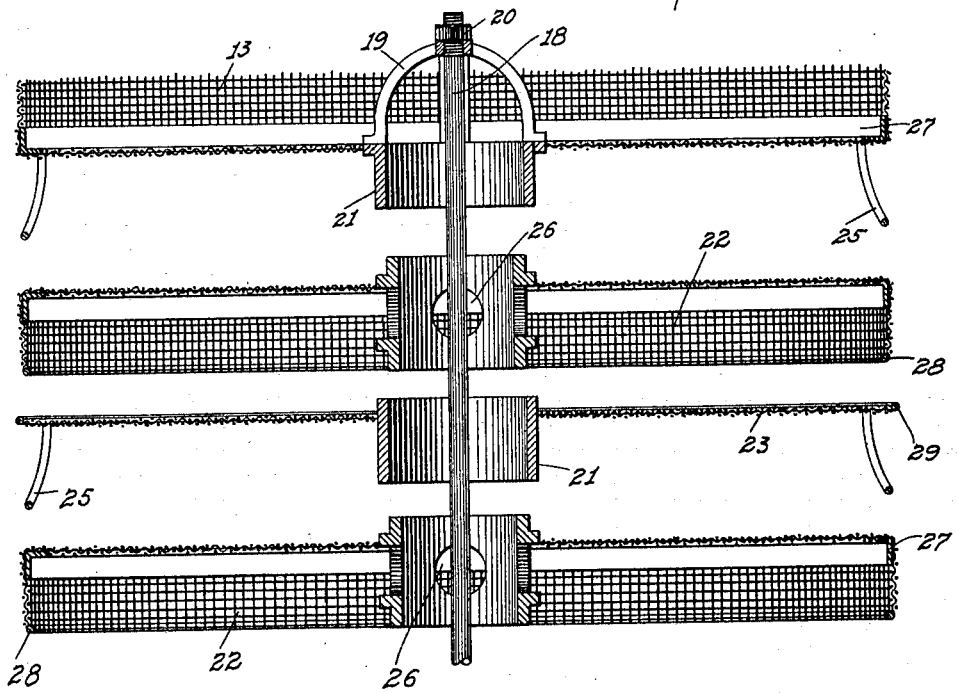
Witnesses
Inventor
B. B. Hogaboom
Attorney

UNITED STATES PATENT OFFICE.

BENJAMIN BALDWIN HOGABOOM, OF ELK GROVE, CALIFORNIA.

STRAINER FOR HONEY-FILLING MACHINES.

1,053,728. Specification of Letters Patent. Patented Feb. 18, 1913.

Application filed December 21, 1911. Serial No. 667,107.

*To all whom it may concern:*

Be it known that I, BENJAMIN B. HOGABOOM, a citizen of the United States, residing at Elk Grove, in the county of Sacramento, State of California, have invented certain new and useful Improvements in Strainers for Honey-Filling Machines; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in honey straining devices, the object of the invention being to produce a honey strainer and filling means for filling cans with honey. The strainer part of the device is such as will readily strain the honey without any danger of clogging or stopping up with the cappings, as is now so often the case in the present form of strainers.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view of the complete device. Fig. 2 is a sectional view taken on a line X—X of Fig. 1. Fig. 3 is a fragmentary view showing a modified form of strainer. Figs. 4 and 5 are sectional views of modified forms of strainer.

Referring now more particularly to the characters of reference on the drawings, 1 designates the strainer tub having a discharge inlet 2. Within said tub is a strainer being substantially drum shaped and made of fine wire mesh 3, the sides of which are disposed at a spaced distance from the inside of the tub 1. The bottom one of the member 3 rests on the bottom supports 4 which holds the same a spaced distance from the bottom of the tub 1, such supports having a plurality of grooves 5 in their under sides to permit the honey spreading completely over the bottom of the tub 1.

Within the member 3 is an auxiliary wire mesh screen 6 supporting a pan or dish 7 into which the member 2 discharges, the honey over-flowing from the pan 7 into the member 3 at a point above its bottom or discharging side by reason of which the cappings, having a tendency to float on the top of the honey, remain always on the top of the honey as at a line 8, whereas the clear strained honey passes through the sides and bottom of the member 3 and below said line 8 into the tub 1 and passing into a chamber 9 from underneath the member 3 as at 10, from which chamber it passes through a discharge member 11 into the usual honey receptacle held in the usual support, these last two members not being shown.

The feature of having the honey strained through the bottom of the member 3 and thence into the chamber 9 from the bottom upward, prevents cappings, as described, or any other deleterious matter from being filled into the cans, since all foreign matter in the honey will float on the top as at line 8, as described.

The strainer mechanism as described can be used for straining materials in which the foreign matter might be heavier than the material to be strained and sink to the bottom, and in that connection the member 3 could be inverted and the material to be strained fed into the same from the bottom upward which would result in keeping the deleterious matter in the bottom of the tub and letting the pure strained matter flow freely from the top as shown briefly in Fig. 3. When this is done the supports 4 will be removed from the screen 3 and the screen 3 reduced in height so that its top line will be below the level of the top edge of the tub 1, so that when inverted as described, the top of said screen 3 will be submerged one, two or more inches as may be desired under the liquid so that the liquid can readily flow through it, thus straining such liquid from the top, the same being fed into the bottom of the tub 1 at the lower edge of the screen 3 by means of any suitable pipe or supply means 12.

Figs. 4 and 5 are sectional views showing a modified form of strainer which may be used if the capacity of the strainer shown in the other views should be insufficient to properly strain the quantity of honey desired. In the structure shown in these figures I employ the same tub 1, the chamber 9 and outlet 11. But for the strainer I provide an upper straining member 13 composed of sides and a bottom made of wire mesh, the bottom having a circumferentially disposed reinforcing angle iron 14. Disposed centrally in the member 13 is a wire mesh supporting member 15 having an upper dish or pan 16 into which discharges the honey supply inlet 17. Disposed centrally through the member 13 is a rod 18 carrying on its upper edge a frame 19, there being a nut 20 mounted on said rod 18 and bearing against said member 19. Disposed around the member 18 are a plurality of pipe like or tubular segments, 21, adjacent ones of said tubular members 21 being adapted to fit one within the other, such tubular members 21 carrying a series of independent screen members 22 composed of a top screen secured to one of said members 21 while a bottom screen 23 for the same is secured to the next adjacent member 21 which fits closely against the said side screens when the said adjacent tubular member is fitted into the tubular member as above shown by Fig. 5, which shows the members all disassociated. Each of these screen members when associated are held so associated with their outer ends by means of any suitable clamp members 24 and are held upward from one another and from sagging by means of downwardly projecting supports 25 which impinge from the upper screen against the screen next below the screen to which they are attached as shown in Fig. 4. The tubular members 21 have orifices 26 opening into the box like screens above described whereby the gravity force of the honey forces the same through the screen 15 and into the tubular members 21 from whence it passes through the orifices 26 into the box like screens as described, where it oozes through the top, bottom and sides and passes off through the intervening space between said screens into the tub 1, and thence through the chamber 9 through the opening 10 as described. In order to permit this operation above described, the mesh of the screen 15 would be much larger than the mesh of the remaining screens in order that the honey may rapidly pass through said screen 15 and into the tubular members 21. Each of the independent screen members of the series has an upwardly reinforcing angle iron 27 and a bottom supporting wire 28 on the sides and a similar supporting wire 29 on the bottom member 21. When the tubular members are all inserted one within the other, as described, then the nut 20 may be tightened to hold the same all in close contact with one another, and when it is desired to disassociate the screens for cleaning purposes the nut 20 may be removed, permitting the frame 19 to be removed and thereupon all of the several parts of the independent screens of the series may be removed for cleansing purposes or otherwise. As before mentioned, this series of screens would only be used in case the capacity of the screen shown in the other figures of the drawings would be insufficient to properly strain the volume of honey.

While this specification sets forth in detail the present and preferred construction of the device, still in practice such deviations from such detail may be resorted to as do not form a departure from the spirit of the invention.

Having thus described my invention, what I claim as new and useful and desire to secure by Letters Patent is:—

1. A device of the character described comprising a tub, a substantial drum shaped strainer disposed within said tub, the sides of said strainer being spaced from the sides of said tub, and the bottom of said strainer being spaced from the bottom of said tub, a chamber in the side of said tub, there being an opening from the bottom of said tub into said chamber, said chamber being provided with an outlet.

2. A device of the character described comprising a tub, a strainer disposed in said tub, the sides of said strainer being spaced from the sides of said tub, and the bottom of said strainer being spaced from the bottom of said tub, an auxiliary screen supporting member disposed within said strainer, a pan held upwardly by said auxiliary screen, a discharging outlet discharging into said pan, a chamber in said tub, such chamber having an opening communicating with the bottom of said tub below the bottom of said strainer, such chamber having a discharging outlet.

3. A device of the character described comprising a tub, a plurality of longitudinal supporting members having a plurality of transverse grooves in their under sides, a strainer mounted on said supporting members, a chamber in the side of said tub, such chamber having an opening in its lower end into said tub and a discharge outlet in said chamber as described.

4. A device of the character described comprising a tub having an independent chamber provided with an outlet, such chamber having an opening communicating with the bottom of said tub, a substantially drum shaped strainer disposed in said tub, such strainer being held upwardly from the bottom of said tub, an independent strainer member mounted within such drum shaped strainer member, a pan mounted on the upper end of said independent strainer member and a discharging member discharging into said pan, as described.

In testimony whereof I affix my signature in presence of two witnesses.

BENJAMIN BALDWIN HOGABOOM.

Witnesses:
C. F. WALTHER,
M. A. MITCHELL.

Copies of this patent may be obtained for five cents each, by addressing the "Commissioner of Patents, Washington, D. C."